US011364586B2

(12) United States Patent
Wensman

(10) Patent No.: US 11,364,586 B2
(45) Date of Patent: Jun. 21, 2022

(54) DEVICE FOR MEASURING AND ADJUSTING THE TOOL HOLDING PORTION OF A SPINDLE

(71) Applicant: Tony Joseph Wensman, Sartell, MN (US)

(72) Inventor: Tony Joseph Wensman, Sartell, MN (US)

(*) Notice: Subject to any disclaimer, the term of this patent is extended or adjusted under 35 U.S.C. 154(b) by 69 days.

(21) Appl. No.: 15/929,506

(22) Filed: May 6, 2020

(65) Prior Publication Data
US 2020/0353582 A1 Nov. 12, 2020

Related U.S. Application Data

(60) Provisional application No. 62/844,504, filed on May 7, 2019.

(51) Int. Cl.
B23Q 17/00 (2006.01)
B23B 31/28 (2006.01)

(52) U.S. Cl.
CPC ............ B23Q 17/002 (2013.01); B23B 31/28 (2013.01)

(58) Field of Classification Search
CPC .... B23Q 17/002; B23Q 17/003; B23Q 17/22; B23Q 17/2216; B23Q 17/2225; B23B 31/28
USPC ............................ 33/626, 636, 637, 638, 639
See application file for complete search history.

(56) References Cited

U.S. PATENT DOCUMENTS

| 2,000,476 | A | 5/1935 | Schmidt |
| 2,832,151 | A | 4/1958 | Emery |
| 2,872,736 | A | 2/1959 | Abbott |
| 3,005,361 | A | 10/1961 | Meyding et al. |
| 3,106,023 | A | 10/1963 | Wilson |
| 3,200,506 | A | 8/1965 | Jeanneret |
| 3,546,781 | A | 12/1970 | Cox et al. |
| 4,433,488 | A | 2/1984 | Baumgartner |
| 4,566,201 | A | 1/1986 | Ishii |
| 4,611,814 | A | 9/1986 | Hiestand |
| 5,131,161 | A * | 7/1992 | Drag .................. G01B 5/245 33/533 |
| 6,205,631 | B1 | 3/2001 | Schweizer |
| 6,343,899 | B1 | 2/2002 | Straub et al. |
| 6,796,050 | B2 | 9/2004 | Haimer et al. |
| 6,857,177 | B2 | 2/2005 | Taylor |
| 7,069,666 | B2 * | 7/2006 | Navarro ................ B23Q 17/22 33/626 |
| 7,140,819 | B2 | 11/2006 | Broghammer et al. |

(Continued)

FOREIGN PATENT DOCUMENTS

| CH | 596924 A5 * | 3/1978 | ........... G01B 5/0004 |
| DE | 102013107791 A1 * | 1/2015 | ........... B23Q 17/003 |

Primary Examiner — Chwen-Wei Su
(74) Attorney, Agent, or Firm — Dunlap Bennett & Ludwig, PLLC

(57) ABSTRACT

A device for simultaneously measuring and adjusting the tool holding portion of a spindle. The device has a body defining a datum surface providing a magnetic portion and an indicator portion. A socket extends from the magnetic portion, the socket dimensioned and adapted to receive and seat a first component of the tool holding portion on the magnetic portion. A compressible indicator tip extends in an outward-biased manner from the indicator portion, wherein a distance from the distal end of the indicator tip and the indicator portion of the datum surface is displayed along the body.

8 Claims, 3 Drawing Sheets

(56) References Cited

U.S. PATENT DOCUMENTS

| | | | |
|---|---|---|---|
| 8,296,963 B1 * | 10/2012 | Omelaz | B23Q 17/2216 33/641 |
| 8,793,887 B2 | 8/2014 | Lange et al. | |
| 2003/0175088 A1 | 9/2003 | Matsumoto et al. | |
| 2004/0111855 A1 | 6/2004 | Pfau | |
| 2006/0048368 A1 | 3/2006 | Pfau | |
| 2007/0039148 A1 | 2/2007 | Neumeier | |
| 2007/0217882 A1 | 9/2007 | Greif et al. | |
| 2008/0112768 A1 | 5/2008 | Matlack et al. | |
| 2010/0308546 A1 | 12/2010 | Maier et al. | |
| 2014/0328639 A1 | 11/2014 | Hofmann | |
| 2017/0036275 A1 | 2/2017 | Haimer | |

* cited by examiner

DEVICE FOR MEASURING AND ADJUSTING THE TOOL HOLDING PORTION OF A SPINDLE

CROSS-REFERENCE TO RELATED APPLICATION

This application claims the benefit of priority of U.S. provisional application No. 62/844,504, filed 7 May 2019, the contents of which are herein incorporated by reference.

BACKGROUND OF THE INVENTION

The present invention relates to devices for machine tools and, more particularly, to a device for measuring and adjusting the tool holding portion of a spindle.

A machine taper is a system for securing a tool in the spindle of a machine tool. A male member of conical form (that is, with a taper) fits into the female socket, which has a matching taper of equal angle. Almost all machine tool spindles have a taper as their primary method of attachment for tools, which enable tool operators to install or remove tool bits quickly and easily.

Machine tapers can be grouped into self-holding and self-releasing classes. With self-releasing tapers, the male member will not stick in the female socket without a drawbar holding it there. A good drawbar force is a function of well-maintained and an accurately adjusted tool holding portion of the spindle. HSK is an example of the self-releasing variety, wherein the tool holding portion includes a clamp set having an outwardly protruding spool.

Maintenance of the tool holding portion requires it to be removed for cleaning, greasing, and the like. Then the tool holding portion needs to be reinstalled. Proper reinstallation requires critical adjustments to the tool holding portion ensure that the spindle functions optimally and safely. For example, the tool holding portion may include a clamp set operatively associated with a spool, wherein there is a critical distance that the spool must protrude from the clamp set. Or more specifically, the critical distance is defined by a distance between the face plate of the spindle and a distal end of the spool. This distance is adjustable by rotating the spool in or out of the clamp set, and this distance/critical dimension may be set by a set screw within the spindle— accessible through a longitudinal bore of the spool and the opening of the clamp set in which the operatively associated spool is received.

Current critical distance measuring tools are designed for general use. For instance, measuring the critical dimension of the tool holding portion by way of a micrometer caliper. In such scenarios, an individual is holding the micrometer caliper in one hand, while adjusting the spool to the predefined critical distance with the other hand. It is very difficult for one person to both hold the measuring device and adjust the tool holding portion without compromising accuracy and time. This problem is compounded by the fact that most spindles are mount vertically, above the head of the individual, and sometime barely at arm's length (and so this measuring-adjustment operation may be happening while standing on a platform).

As can be seen, there is a need for a device for measuring and adjusting the tool holding portion of a spindle that resolves the inaccuracies inherent in how the spool component has been adjusted in the past. Through the present invention, one person can single-handedly conduct the complete measuring and adjusting of the tool holding portion of an electric spindle, facilitating higher accuracy, ease of use, faster installation and verification checks of the tool holding portion.

In short, the present invention allows one person to simultaneously measure and move/adjust a first component of a two-component tool holding portion relative to the spindle. The present invention provides a magnetic attachment between the first component and a datum surface that enables rotating the first component relative to the spindle while measuring a distance between the datum surface and the spindle.

The present invention is machined to provide a body having a planar datum surface. The datum surface includes a magnetic portion for magnetically connecting a distal end of the first component to the datum surface. The datum surface also includes a socket dimensioned and adapted to engage said distal end for rotating the first component relative to the spindle about a longitudinal axis shared by the first component, the tool holding portion, and, possibly, even the spindle itself.

The body has an indicator aperture spaced apart from the socket. The indicator aperture enables an indicator tip of a distance measuring instrument to protrude therefrom in an outwardly-biased manner. The indicator tip is operatively associated with the distance measuring instrument for measuring the distance from the datum surface and the distal end of the tip of the indicator.

By way of the magnetic attachment, one person can single-handedly move and measure a distal end of the first component relative to the spindle, facilitating speedy and accurate positioning or verification of the tool holding portion on a one-headed machine or multiple-headed machines.

These and other features, aspects and advantages of the present invention will become better understood with reference to the following drawings, description and claims.

SUMMARY OF THE INVENTION

In one aspect of the present invention, a device includes the following: a body defining a datum surface, the datum surface having a magnetic portion and an indicator portion; a socket extends from the magnetic portion; and a compressible indicator tip extending in an outward-biased manner from the indicator portion in such a way that a distance from the distal end of the indicator tip and the datum surface is displayed along the body.

In another aspect of the present invention, a device for simultaneously measuring and adjusting a tool holding portion of a spindle includes the following: a body defining a datum surface, the datum surface having a magnetic portion and an indicator portion; a socket extends from the magnetic portion, wherein the socket is dimensioned to seat a distal end of a first component of the tool holding portion on the magnetic portion; one or more rotational engagement structures for rotationally engaging the distal end along its longitudinal axis; a compressible indicator tip extending in an outward-biased manner from the indicator portion in such a way that a distance from the distal end of the indicator tip and the datum surface is displayed one a display device; and the display device is rotatably connected to the body.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, the present invention includes a device for simultaneously measuring and adjusting the tool holding portion of a spindle. The device has a body defining a datum surface providing a magnetic portion and an indicator portion. A socket extends from the magnetic portion, the socket dimensioned and adapted to receive and seat a first component of the tool holding portion on the magnetic portion. A compressible indicator tip extends in an outward-biased manner from the indicator portion, wherein a distance from the distal end of the indicator tip and the indicator portion of the datum surface is displayed along the body.

Figure 1:
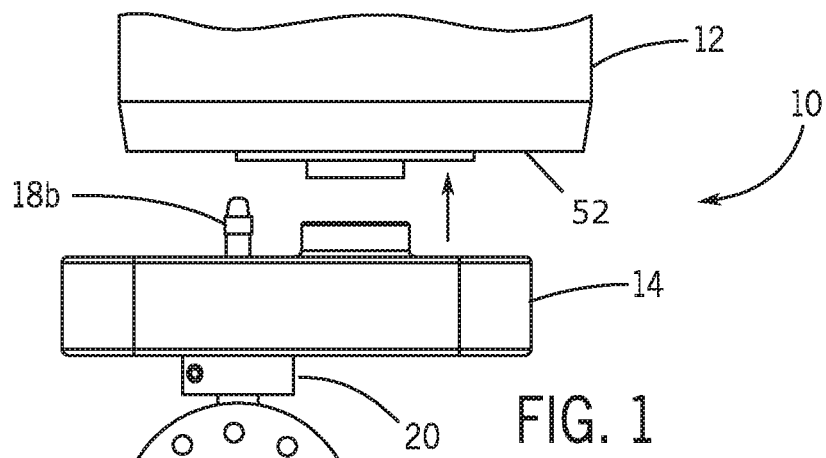
FIG. 1 is an exploded elevation view of an exemplary embodiment of the present invention.
Figure 2:
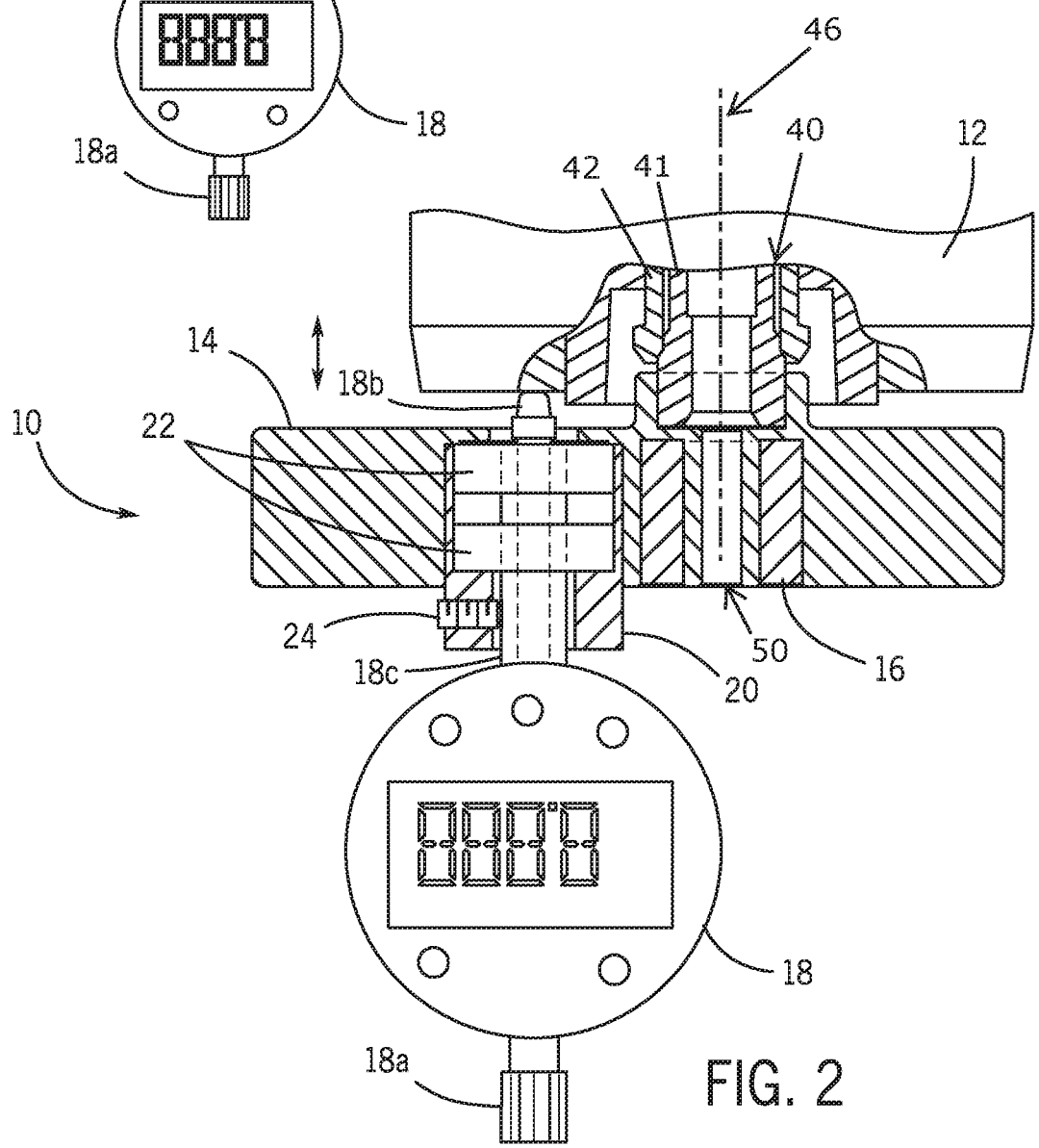
FIG. 2 is a side elevation view of an exemplary embodiment of the present invention shown in use, with parts broken away.
Figure 3:
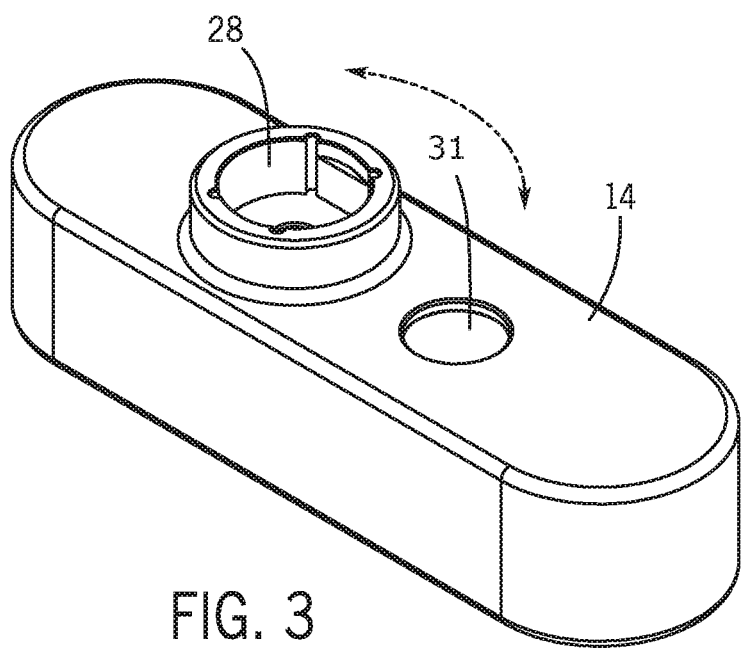
FIG. 3 is a top perspective view of an exemplary embodiment of the present invention.
Figure 4:
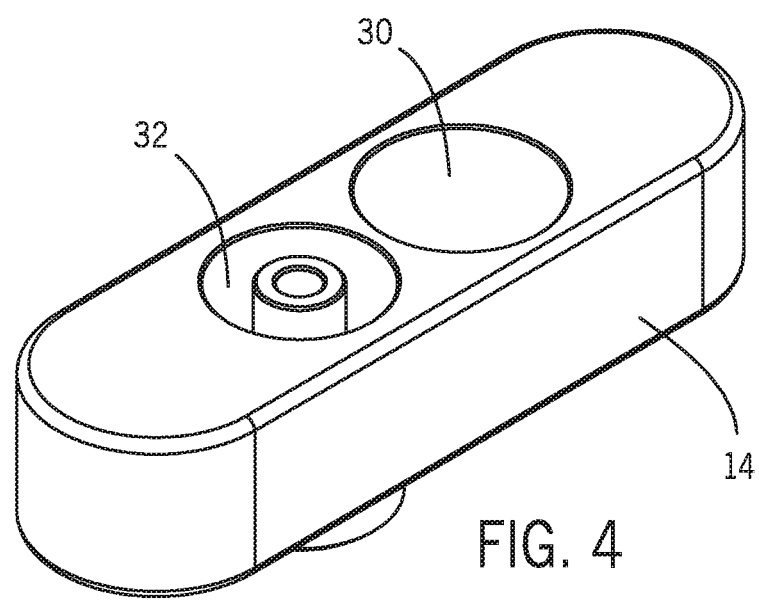
FIG. 4 is a bottom perspective view of an exemplary embodiment of the present invention.
Figure 5:
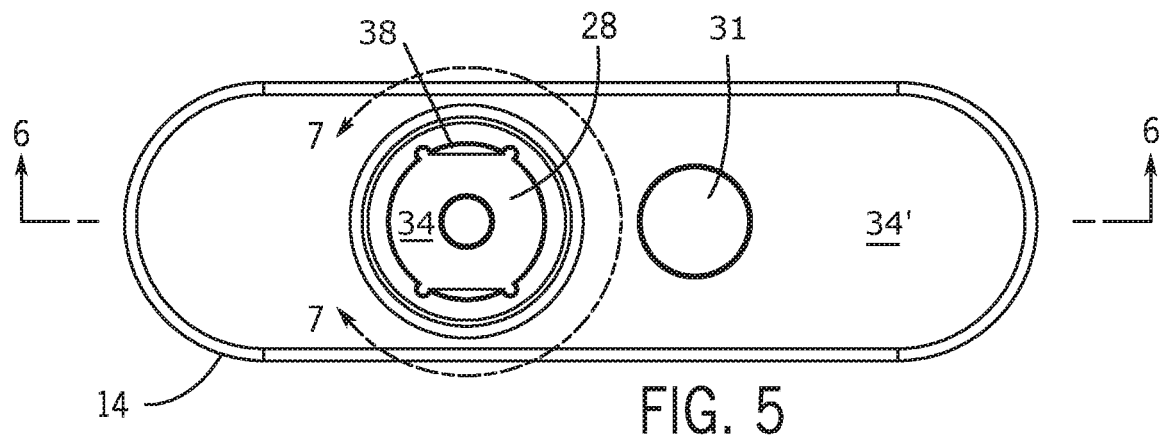
FIG. 5 is a top plan view of an exemplary embodiment of the present invention.
Figure 6:
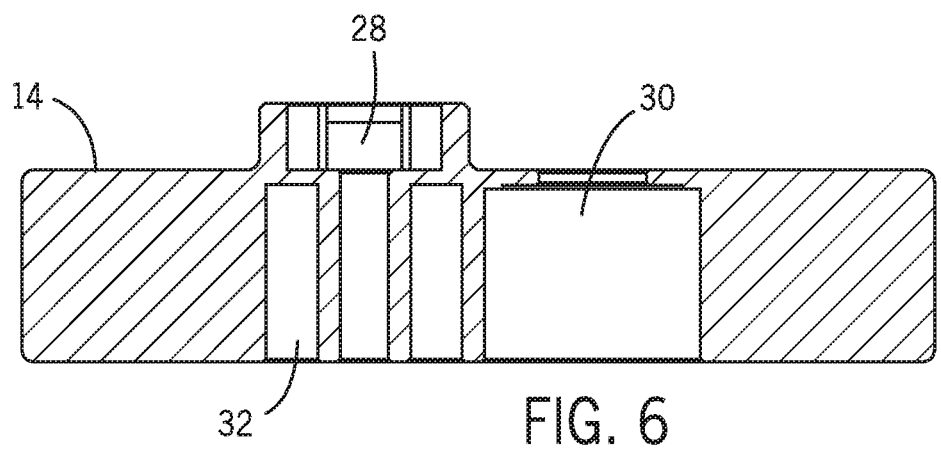
FIG. 6 is a cross-sectional view of an exemplary embodiment of the present invention, taken along line 6-6 of FIG. 5.
Figure 7:
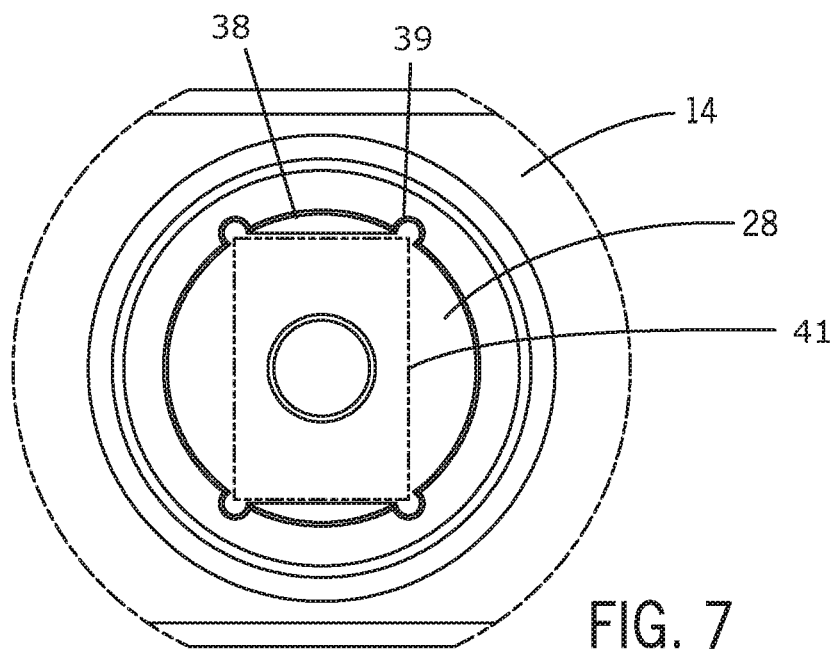
FIG. 7 is a detail plan view of an exemplary embodiment of the present invention, indicated by line 7-7 of FIG. 5.

Referring to FIGS. 1 through 7, the present invention may include a device 10 for measuring and adjusting a tool holding portion 40 of a spindle 12. In certain embodiments, the tool holding portion 40 may have a first component 41 and a second component 42. The first component 41 may be a spool, while the second component 42 is a clamp of an HSK clamp set. Here, the clamp in an actuated state (e.g., activated by the drawbar of the self-releasing machine type) engages a taper of a machine tool; the spool facilitates the proper operation of the actuated state but only when its distal end is disposed at a critical distance from a face plate 52 of the spindle 12.

The device 10 has a body 14 defining a planar datum surface 34' (or two spaced apart surfaces—34' and 34—that are coplanar). A socket 28 is connected to the datum surface 34. The socket 28 may include sidewalls extending from the datum surface 34. The sidewall may provide diametrically opposing wrench flats 38 and corner engagers 39. A socket lumen 50 communicates the datum surface 34 with the other side of the body 14. About the socket lumen 50 on the inside of the body 14 is a magnet 16. The magnet 16 may be disposed in a magnet pocket 32. An indicator aperture 31 in the datum surface 34 is spaced apart from the socket 28. The indicator aperture 31 communicates to a bearing housing 30. A portion of a distance measuring instrument 18 may be removably engaged in the bearing housing 30 so that an indicator tip 18 protrudes out from the indicator aperture 31 in an outward-biased manner. The distance measuring instrument 18 may be a digital traveling indicator or the like adapted to measure linear dimensions between the datum surface 34 and the distal end of the indicator tip 18b.

The distance measuring instrument 18 may be rotatably connected to the bearing housing 30 by way of a mounting clamp 20 and roller bearing 22 with a set screw 24, whereby the display of the distance measuring instrument 18 rotates relative to the body 14. The digital indicator 18 may include a cap 18a and a tube 18c. The bearing indicator housing 30 may be made from 6061 billet aluminum that is machined to specific dimensions.

In use, the socket 28 of the device 10 slidably receives and seats the distal end of the first component 41 on the datum surface 34 in a rotatable and magnetic engagement. In the rotatable engagement, the wrench flats 38 and/or the corner engagers 39 of the socket 28 may operatively associate with the distal end of the first component 41, which will typically have complementary wrench flats and corners, respectively (even if not clearly shown in the attached Figures). Through the rotational engagement, a user may rotate the first component 41 relative to the spindle 12 about a shared longitudinal axis 46. This rotation enables the user to selectively increase or decrease the critical dimension between the spindle 12 (at least the face plate 52 thereof) and the distal end of the first component 41.

Simultaneously, the magnet 16 magnetically engages said distal end and the datum surface 34 of the socket 28. At which point, the device 10 would engage the first component 41 without a user handling either. This is handy for vertically oriented spindle 12 assemblies and when simultaneously adjusting the distal end and measuring above-mentioned critical dimension.

During the rotational and magnetic engagement the outwardly-biased indicator tip 18b confirms/contacts the face plate 52, thereby measuring the critical dimension between the face plate 52 of the spindle 12 and the datum surface 34—i.e., the distal end of the first component 41 seated on the datum surface 34. (Assuming that before mounting the device 10, the digital traveling indicator 18 was tared or zeroed—i.e., the distance between datum surface 34' of the body 14 and the datum surface 34 circumscribed by the socket 28 measured zero units).

In the rotational and magnetic engagement (the magnetic connection facilitates rotational engagement), the body 14 rotates about the longitudinal axis 46, while the indicator tip 18b maintains/confirms contact with the (planar) face plate 52 of the spindle 12. Since the di distance measuring instrument 18 is rotatably connected to the bearing housing 30, the display of the distance measuring instrument 18 rotates independently from the rotational engagement about the longitudinal axis 46, thereby the display (and thus the critical dimension) can be constantly monitored while adjusting said critical dimension.

During this adjustment, when the predefined critical dimension is obtained, a separate elongated tool (not shown), such as a Tee-wrench, can be slid through the socket lumen 50 to tighten a set screw (not shown) of the tool holding portion 40, setting/fixing the critical dimension, and completing the task at hand. The set screw is disposed in the longitudinal bore defined by the first component 41 and the opening of the second component 42 receiving the first component 41, illustrated in FIG. 2.

While the device 10 is still operatively associated with (magnetically engaged to) the tool holding portion 40, the latter can be actuated through the spindle 12/drawbar a few times to make sure the critical dimension is correct. If the critical dimension changes during this trial run, then the user would re-adjust. Once achieved, the user would remove the device 10.

The body 14 may be made from 6061 billet aluminum or other material with similar properties. The body 14 may be dimensioned and machined to specific dimensions to allow for attachment to a clamp set spool of an electric spindle assembly of a HSK headed machine.

It should be understood, of course, that the foregoing relates to exemplary embodiments of the invention and that modifications may be made without departing from the spirit and scope of the invention as set forth in the following claims.

What is claimed is:

1. A device, comprising:
    a body defining a datum surface, the datum surface having a magnetic portion and an indicator portion;
    a socket extends from the magnetic portion; and
    a compressible indicator tip extending in an outward-biased manner from the indicator portion in such a way that a distance from a distal end of the indicator tip and the datum surface is displayed along the body, wherein the socket is dimensioned to seat a distal end of an elongated component on the magnetic portion, wherein the elongated component is a first component of a tool holding portion of a spindle.

2. The device of claim 1, wherein the first component is a spool of a clamp set.

3. The device of claim 1, further comprising one or more rotational engagement structures for rotationally engaging the distal end of said elongated component along its longitudinal axis.

4. The device of claim 3, wherein the one or more rotational engagement structures comprise wrench flats along an inner periphery of the socket.

5. The device of claim 1, further comprising a display device operatively associated the indicator tip for displaying said distance.

6. The device of claim 5, wherein the display device is rotatably connected to the body.

7. A device for simultaneously measuring and adjusting a tool holding portion of a spindle, comprising:
    a body defining a datum surface, the datum surface having a magnetic portion and an indicator portion;
    a socket extends from the magnetic portion, wherein the socket is dimensioned to seat a distal end of a first component of the tool holding portion on the magnetic portion;
    one or more rotational engagement structures for rotationally engaging the distal end along its longitudinal axis;
    a compressible indicator tip extending in an outward-biased manner from the indicator portion in such a way that a distance from a distal end of the indicator tip and the datum surface is displayed on a display device; and
    the display device is rotatably connected to the body.

8. The device for simultaneously measuring and adjusting a tool holding portion of a spindle, of claim 7, wherein the first component is a spool of a clamp set.

* * * * *